United States Patent
Omran et al.

(10) Patent No.: US 12,351,485 B1
(45) Date of Patent: Jul. 8, 2025

(54) NANOCOMPOSITE FOR WATER DECONTAMINATION

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/073,425

(22) Filed: Mar. 7, 2025

(51) Int. Cl.
*C02F 1/28* (2023.01)
*B01J 20/02* (2006.01)
(Continued)

(52) U.S. Cl.
CPC ........... *C02F 1/288* (2013.01); *B01J 20/0222* (2013.01); *B01J 20/04* (2013.01); *B01J 20/22* (2013.01); *B01J 20/28033* (2013.01); *B01J 20/28059* (2013.01); *B01J 20/28071* (2013.01); *B01J 20/28083* (2013.01); *C02F 1/281* (2013.01); *C02F 1/283* (2013.01); *B01J 2235/15* (2024.01);
(Continued)

(58) Field of Classification Search
CPC .......... C02F 1/288; C02F 1/281; C02F 1/283; C02F 2101/20; C02F 2101/308; B01J 20/205; B01J 20/0222; B01J 20/04; B01J 20/22; B01J 20/28033; B01J 20/28059; B01J 20/28071; B01J 20/28083; B01J 2235/15

USPC ........................... 423/15, 152, 182, 198, 200
See application file for complete search history.

(56) References Cited

U.S. PATENT DOCUMENTS

2024/0038424 A1    2/2024    Lyu et al.

FOREIGN PATENT DOCUMENTS

| CN | 109772412 A | 5/2019 |
|---|---|---|
| CN | 110496593 A | 11/2019 |
| CN | 115254003 B | 5/2023 |

OTHER PUBLICATIONS

Al-Farraj, E.S. and Abdelrahman, E.A., 2024. Efficient photocatalytic degradation of congo red dye using facilely synthesized and characterized MgAl2O4 nanoparticles. ACS omega, 9(4), pp. 4870-4880 (Year: 2024).*

(Continued)

*Primary Examiner* — Magali P Slawski
*Assistant Examiner* — Bernadette Karen McGann
(74) *Attorney, Agent, or Firm* — Oblon, McClelland, Maier & Neustadt, L.L.P.

(57) ABSTRACT

A method of removing a contaminant from water may include contacting contaminated water, including a heavy metal and/or an organic pollutant, with a nanocomposite including graphitic $C_3N_4$, $MnO_2$, and $MgAl_2O_4$ in a mass relationship to each other in a range of from 5 to 15:2 to 7:75 to 95, thereby adsorbing the heavy metal and/or the organic pollutant onto the nanocomposite, as an adsorbed material. The method may further include removing the adsorbed material from the contaminated water, thereby reducing a concentration of the heavy metal in the contaminated water by at least 2 percent by weight (wt. %), the heavy metal may include Cd, Cr, Cu, Fe, Pb, Ni, Ag, Zn, and/or U, and the organic pollutant may include a dye.

20 Claims, 7 Drawing Sheets

50 →

Contact contaminated water, include a heavy metal and/or an organic pollutant, with a nanocomposite include graphitic $C_3N_4$, $MnO_2$, and $MgAl_2O_4$ in a mass relationship to each other in a range of from 5 to 15 : 2 to 7 : 75 to 95, and thereby adsorb the heavy metal and/or the organic pollutant onto the nanocomposite, as an adsorbed material — 52

↓

Remove the adsorbed material from the contaminated water, thereby reduce a concentration of the heavy metal in the contaminated water by at least 2 wt.% — 54

(51) Int. Cl.
*B01J 20/04* (2006.01)
*B01J 20/22* (2006.01)
*B01J 20/28* (2006.01)
*C02F 101/20* (2006.01)
*C02F 101/30* (2006.01)

(52) U.S. Cl.
CPC .... *C02F 2101/20* (2013.01); *C02F 2101/308* (2013.01)

(56) References Cited

OTHER PUBLICATIONS

Prabakaran, E. and Pillay, K., Preparation of Z-Scheme G-C3n4/Mno2 Nanocomposite with Enhanced Photocatalytic Degradation of Brilliant Green Dye Under Visible Light Irradiation. (Aug. 29, 2024) (Year: 2024).*

E. Prabakaran, et al., "Preparation of Z-scheme g-C3N4/MnO2 nanocomposite with enhanced photocatalytic degradation of brilliant green dye under visible light irradiation", Department of Chemical Science, University of Johannesburg, Doornfontein Campus, Johannesburg, South Africa, 31 pages.

* cited by examiner

NANOCOMPOSITE FOR WATER DECONTAMINATION

BACKGROUND

Technical Field

The present disclosure is directed towards water decontamination techniques, and more particularly, relates to a method of removing contaminants from water using a nanocomposite including graphitic $C_3N_4$, $MnO_2$, and $MgAl_2O_4$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The presence of both inorganic and organic pollutants in environmental systems has resulted in serious harm, often leading to disastrous consequences. Heavy metal ions are among the most concerning pollutants due to high toxicity, carcinogenic nature, and non-biodegradable characteristics of heavy metal ions. Currently, certain water bodies are significantly contaminated by heavy metals, which primarily result from anthropogenic activities, including chemical, textile, leather, plastic, mining, battery, paint and pigment, and paper and pulp industries. Common heavy metals found in industrial wastewater include, but are not limited to, cadmium (Cd), chromium (Cr), copper (Cu), iron (Fe), lead (Pb), nickel (Ni), silver (Ag), zinc (Zn), and uranium (U). Among these, Cu may be particularly prevalent in wastewater due to its extensive use in various engineering applications such as metal finishing, electroplating, and etching. A discharge of the aforementioned toxic metals into water streams and effluents without adequate treatment poses a severe threat to biotic systems. Through the food chain, heavy metals may accumulate in living organisms, potentially leading to severe health conditions such as cancer, nervous system damage, and kidney failure, and may ultimately be fatal at high concentrations. In response to this growing concern, various remediation techniques, such as ion exchange, precipitation, coagulation, membrane filtration, reverse osmosis, and adsorption, have been employed to remove toxic metal ions. Among these methods, adsorption is highly favored due to high removal efficiency, cost-effectiveness, and ability to target trace amounts of ions.

Graphite-phase carbon nitride (g-$C_3N_4$) has recently gained attention as a promising material for heavy metal removal due to certain desirable properties, including cost-effectiveness, metal-free n-type semiconductor nature, chemical and thermal stability, visible light responsiveness, and ease of preparation, as described by Singh and coworkers in J. Water Proc. Eng. 2014, 4, 233-241, which is incorporated by reference herein. However, g-$C_3N_4$ exhibits several drawbacks, such as low specific surface area, rapid electron-hole recombination, and challenging exfoliation. To overcome the above listed limitations, emphasis has been placed on modifying the microstructure and incorporating heteroatom doping. Infusing g-$C_3N_4$ nanosheets with metal nanoparticles may prevent the aggregation of g-$C_3N_4$ sheets, thereby enhancing the specific surface area and adsorption capacity. Various composites such as $MgY_2O_4$-g-$C_3N_4$, Ox-g-$C_3N_4$/Pani-NF, and $CoFe_2O_4$-g-$C_3N_4$ have been utilized for the removal of copper ions, whereas cadmium ion removal has been achieved using composites like CdS/g-$C_3N_4$, $Y_2O_3$@g-$C_3N_4$, and ZnO-g-$C_3N_4$. Furthermore, several studies have reported that incorporating metal oxides can enhance the pore volume and average pore size of the material, further improving adsorption efficiency, as described by Sharma and coworkers in Mater. Res. Innov. 2022, 26 (2), 65-75, and Li and coworkers in J. Mater. Chem. 2021, 9 (26), 15019-15026, each of which is incorporated by reference herein.

Despite the above suggested advancements, existing methods for heavy metal removal exhibit several limitations, including high operational costs, complex processing requirements, secondary waste generation, and limited efficiency at high concentrations of contaminants. Therefore, there is a requirement for development of advanced materials and techniques that may offer enhanced adsorption capabilities, improved reusability, and environmental sustainability.

Accordingly, one object of the present disclosure is to provide a method of water decontamination using carbon nanomaterials, that may circumvent the above specified drawbacks and limitation of the methods known in the art.

SUMMARY

In an exemplary embodiment, a method of removing a contaminant from water may include contacting contaminated water, including a heavy metal and/or an organic pollutant, with a nanocomposite including graphitic $C_3N_4$, $MnO_2$, and $MgAl_2O_4$ in a mass relationship to each other in a range of from 5 to 15:2 to 7:75 to 95±5, 4, 3.33, 2.5, 2, 1.5, 1, 0.75, 0.67, 0.5, 0.33, 0.25, 0.125, 0.1, 0.05, or 0.01, thereby adsorbing the heavy metal and/or the organic pollutant onto the nanocomposite, as an adsorbed material. The method further may include removing the adsorbed material from the contaminated water, thereby reducing a concentration of the heavy metal in the contaminated water by at least 2 percent by weight (wt. %), the heavy metal may include Cd, Cr, Cu, Fe, Pb, Ni, Ag, Zn, and/or U, and the organic pollutant may include a dye.

The average pore distribution of the nanocomposite may be unimodal, a Brunauer-Emmett-Teller (BET) specific surface area of the nanocomposite may be in a range of 16.2 $m^2$/g to 20.2 $m^2$/g (43.3±5, 4, 3.33, 2.5, 2, 1.5, 1, 0.75, 0.67, 0.5, 0.33, 0.25, 0.125, 0.1, 0.05, or 0.01 $m^2$/g), and/or an average pore diameter of the nanocomposite, according to Barrett-Joyner-Halenda (BJH) measurement method, may be in a range of 5 nanometer (nm) to 15 nm (8.34±1.5, 1, 0.75, 0.67, 0.5, 0.33, 0.25, 0.125, 0.1, 0.05, or 0.01 nm), and/or an average pore volume of the nanocomposite, according to the BJH measurement method, may be in a range of from 0.025 $cm^3$/g to 0.075 $cm^3$/g (0.05±0.01, 0.0075, 0.005, 0.0025, or 0.001 $cm^3$/g).

The nanocomposite may have a (220) spinel interplanar spacing in a range of from 0.258 to 0.338 nm (0.298 nm), (400) spinel interplanar spacing in a range of from 0.165 to 0.245 nm (0.205 nm), (002) $MnO_2$ interplanar spacing in a range of from 0.106 to 0.186 nm (0.146 nm), and/or (211) $Al_2O_3$ interplanar spacing in a range of from 0.093 to 0.173 nm (0.133 nm), according to selected area diffraction (SAED).

The mass relationship of the nanocomposite may be in a range of 9 to 11:4 to 6:84 to 86. The nanocomposite may have a (220) spinel interplanar spacing of 0.298±2% nm, (400) spinel interplanar spacing of 0.205±2% nm, (002) $MnO_2$ interplanar spacing of 0.146±2% nm, and/or (211)

$Al_2O_3$ interplanar spacing of 0.133±2% nm, according to selected area diffraction. An X-ray diffraction (XRD) spectrum of the nanocomposite under Cu-filtered Cu-Kα radiation (1.5418 Å) powered at 45 kV and 10 mA may have peaks of an $MnO_2$ pyrolusite phase at 28.4±1°, 40.5±1°, 44.9±1°, 56.0±1°, 66.4±1°, and/or 79.1±1°, an $MgAl_2O_4$ spinel phase at 19.1±1°, 31.3±1°, 44.8±1°, 56.1±1°, 59.5±1°, 74.09±1°, and/or 78.1±1°, an MgO cubic phase at 42.8±1°, 62.2±1°, and/or 74.6±1°, an $Al_2O_3$ phase at 31.3±1°, 34.3±1°, and/or 61.6±1°, and/or $g$-$C_3N_4$-related diffractions at 18.8±1°, 28.2±1°, 35.5±1°, 40.7±1°, 44.6±1°, and/or 73.7±1°, and no more than 5% relative intensity of any other phase may be detected in the XRD spectrum.

The organic pollutant may be adsorbed and may include an indolinone sulfonate substructure (e.g., indigo carmine) in a mass ratio of 0.01 to 0.2 parts (0.0954±0.075, 0.067, 0.05, 0.033, 0.025, or 0.01) parts of the organic molecules per part of the nanocomposite.

The nanocomposite may have no more than 0.1, 0.05, 0.01, 0.001, 0.0001, or 0.00001 parts, individually or in any combination, of thiol, amine, carboxylate, and hydroxyl functionalization per 100 $MnO_2$ units (or per $MnO_2$ unit, or, e.g., per 1 mg $MnO_2$) in a total metal oxide weight.

The nanocomposite may include no more than 1 wt. %, individually or in any combination, of $TiO_2$, $Ti_2AlN$, $Fe_3O_4$, AlN, ZnO, and/or $SiO_2$, relative to a total metal oxide weight.

The nanocomposite may include no more than 1, 0.75, 0.5, 0.25, 0.1, 0.01, 0.001, 0.0001, or 0.00001 atoms of Ce, relative to 100 atoms of Mn.

The carbon materials in the nanocomposite may include no more than 1, 0.75, 0.5, 0.25, 0.1, 0.01, 0.001, 0.0001, or 0.00001 wt. %, individually or in combination, of carbon nanotubes and/or carbon dots, relative to total nanocomposite weight.

The nanocomposite may include no more than 1, 0.75, 0.5, 0.25, 0.1, 0.01, 0.001, 0.0001, or 0.00001 wt. % of AgBr, relative to a total metal oxide weight. The nanocomposite may include no more than 1, 0.75, 0.5, 0.25, 0.1, 0.01, 0.001, 0.0001, or 0.00001 wt. % of tungsten oxide, relative to a total nanocomposite weight. The nanocomposite may include no more than 1, 0.75, 0.5, 0.25, 0.1, 0.01, 0.001, 0.0001, or 0.00001 wt. % of Co, relative to total nanocomposite weight.

The nanocomposite may include no more than 1, 0.75, 0.5, 0.25, 0.1, 0.01, 0.001, 0.0001, or 0.00001 wt. %, individually or in combination, of CuO and/or $WO_3$, relative to total nanocomposite weight.

The nanocomposite may include no more than 1, 0.75, 0.5, 0.25, 0.1, 0.01, 0.001, 0.0001, or 0.00001 wt. %, individually or in combination, of elemental state Co and/or Fe, relative to total nanocomposite weight.

The method may avoid or not include sonicating any starting materials in a range of from 1 kilohertz (kHz) to 100 kHz, or above 1, 2.5, 5, 10, or 15 kHz.

The nanocomposite may include no more than 10, 7.5, 5, 4, 3, 2, 1, 0.75, 0.5, 0.25, 0.1, 0.01, 0.001, 0.0001, or 0.00001 wt. % MgO, relative to a total metal oxide weight, and the nanocomposite may include no clay.

The nanocomposite obtained may include no more than 1, 0.75, 0.5, 0.25, 0.1, 0.01, 0.001, 0.0001, or 0.00001 wt. % carbonaceous material besides the graphitic carbon nitride, and carbon materials in the nanocomposite include no nanotubes, relative to total nanocomposite weight, e.g., no more than 5, 4, 3, 2.5, 2, 1, 0.5, 0.1, 0.01, 0.001, 0.0001, or 0.00001 wt. %, relative to total nanocomposite weight or total carbonaceous material weight in the nanocomposite, of nanotubes.

The nanocomposite may include no more than 10, 7.5, 5, 4, 3, 2, 1, 0.75, 0.5, 0.25, 0.1, 0.01, 0.001, 0.0001, or 0.00001 wt. % $VO_4$, relative to total vanadium-oxide weight. The nanocomposite may include no more than 1, 0.75, 0.5, 0.25, 0.1, 0.01, 0.001, 0.0001, or 0.00001 wt. % V-doped ZnO, relative to total nanocomposite weight.

In some embodiments, relative to a total metal oxide weight, the nanocomposite may include no more than 1, 0.75, 0.5, 0.25, 0.1, 0.01, 0.001, 0.0001, or 0.00001 wt. %, individually or in any combination, of $K_2Ti_8O_{17}$, $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}$ (Co, Ni, Zn)$_{0.7}Fe_2O_4$, $LaCO_{0.5}Fe_{0.5}O_3$, $Mg_{0.1}Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}CO_{0.25}Fe_{2-x}O_4$, $Zn_{0.5}CO_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5\,\delta}$, $NaNbO_3$, and $LaFeO_3$.

The graphitic $C_3N_4$ in the nanocomposite may consist essentially of sheet morphologies, i.e., such that no more than 5% of the average absorption rate of indigo carmine over the first 30 minutes is lost relative to a nanocomposite with pure sheet morphologies. The graphitic $C_3N_4$ in the nanocomposite may include no more than inevitable traces of boron.

The nanocomposite may include no more than 10, 7.5, 5, 4, 3, 2, 1, 0.75, 0.5, 0.25, 0.1, 0.01, 0.001, 0.0001, or 0.00001 wt. %, individually or in any combination, relative to total metal content, of any of Zn, Ce, Gd, La, Ba, Ti, Ca, Sr, Zr, Pb, Ni, Ag, Co, Cu, Mn, Cd, W, Ta, Nb, Pr, and/or Bi, and the nanocomposite may include no more than 1, 0.75, 0.5, 0.25, 0.1, 0.01, 0.001, 0.0001, or 0.00001 wt. %, individually or in any combination, relative to total carrier weight, of $SiO_2$, $TiO_2$, ZnO, and/or ZnS.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
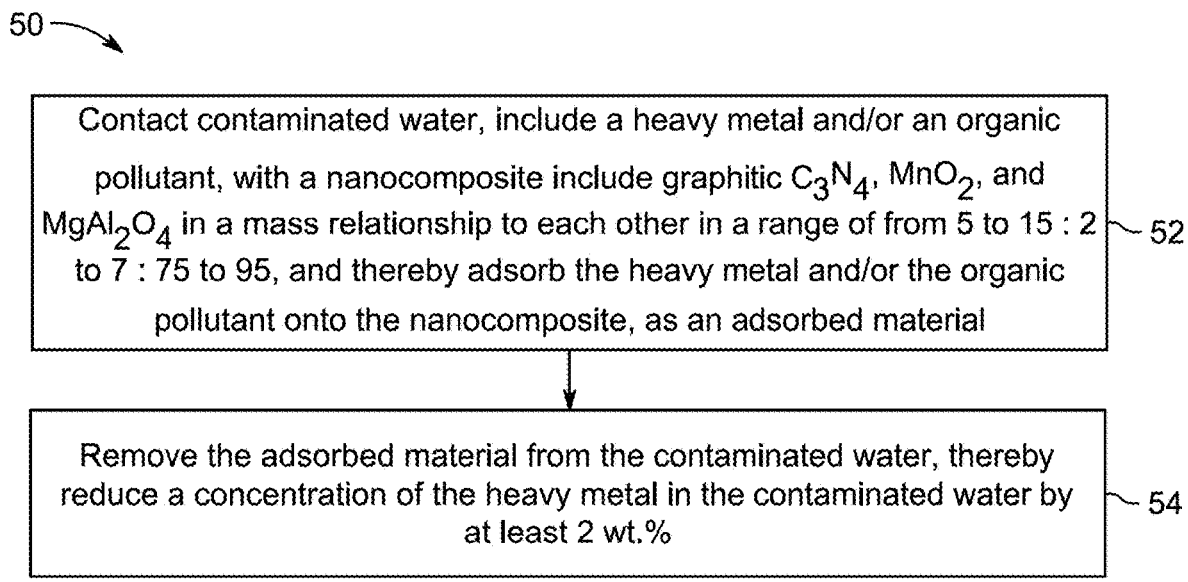
FIG. 1 is an exemplary flow chart of an inventive method of removing a contaminant from water.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (C)+3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that may have at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are superior to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3$/g) and is an important parameter in characterizing the porous structure of materials, such as adsorbents or catalysts.

As used herein, the term 'photodegradation' refers to the process by which a material undergoes chemical breakdown or alteration due to exposure to light. This process typically results in the breaking of molecular bonds within the material, leading to the formation of new compounds or the degradation of its physical and chemical properties.

As used herein, the term 'contaminants' refer to the harmful substances or contaminants that degrade the quality of water, air, soil, or food, making them unsafe or unsuitable for specific uses. In water, contaminants include biological agents like bacteria, viruses, and parasites; chemical substances such as heavy metals, pesticides, pharmaceuticals, and industrial chemicals; and physical materials like dirt, debris, and sediment. These contaminants can pose serious risks to human health, the environment, and ecosystems, depending on their type, concentration, and exposure levels.

As used herein, the term 'organic contaminants' refers to carbon-based compounds, typically derived from industrial, agricultural, or domestic activities, that are present as contaminants in water or the environment. These contaminants may include pesticides, pharmaceuticals, dyes, and other synthetic or natural organic substances that can pose environmental or health risks.

The organic contaminant may be a dye, a phenol, a polycyclic aromatic hydrocarbon, an herbicide, a pesticide, a persistent organic contaminant, or the like.

The organic contaminant may be a dye alone, or may be in addition to other contaminants or other organic contaminants. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIASH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O—, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor,alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic contaminant is a toxic organic chemical that adversely affects human and environmental health, can be transported by wind and water, and can persist for years, decades, or centuries owing to resistance to environmental degradation by natural chemical, biological, or photolytic processes. Persistent organic contaminants are regulated by the United Nations Environment Programme 2001 Stockholm Convention on Persistent Organic Contaminants. Examples of persistent organic contaminants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane (α- and β-), hexabromodiphenyl ether, lindane, pentachlorobenzene, tetrabromodiphenyl ether, perfluorooctanesulfonic acid, endosulfans, and hexabromocyclododecane.

As used herein, the term 'unimodal' refers to a distribution or pattern that has a single peak or mode. In the context of particle size or material properties, it indicates that the sample consists of particles or components that are primarily of one size or characteristic, rather than varying widely in size or composition.

As used herein, the term 'spinel interplanar spacing' refers to the distance between parallel planes of atoms in the crystal structure of a spinel material. Spinel is a type of mineral with a specific crystalline arrangement, represented by the general formula $AB_2O_4$, where 'A' and 'B' are metal ions. The interplanar spacing may be crucial for understanding the material's structural properties and is typically measured using X-ray diffraction (XRD) techniques.

A weight percent of a component, unless specifically stated to the contrary, may be based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

A method may form a nanocomposite of graphitic carbon nitride (g-$C_3N_4$), manganese oxide ($MnO_2$), and magnesium aluminate ($MgAl_2O_4$) (g-$C_3N_4$@ $MnO_2$/$MgAl_2O_4$). Each component of the nanocomposite, when used in appropriate ratios, is effective in the removal of organic contaminants in water with high efficiency and removal activity.

A nanocomposite (g-$C_3N_4$@ $MnO_2$/$MgAl_2O_4$) including g-$C_3N_4$, $MnO_2$, and $MgAl_2O_4$ may include coating of g-$C_3N_4$ on $MnO_2$ and $MgAl_2O_4$. The g-$C_3N_4$, $MnO_2$, and $MgAl_2O_4$ are present in the nanocomposite in a mass relationship to each other in a range of from 5 to 15:2 to 7:75 to 95, preferably 7 to 13:3 to 6:80 to 90, and preferably 9 to 11:4 to 5:84 to 86. The g-$C_3N_4$, $MnO_2$, and $MgAl_2O_4$ may be present in the nanocomposite in a mass relationship to each other of 10:5:85 wt. %, while tolerable variations of any of these values may be±2.5, 2, 1.5, 1, 0.75, 0.5, 0.25, 0.1, 0.5, or 0.1. The nanocomposite exhibits excellent performance in photodegradation of organic pollutants, hydrogen generation, and anticancer activity. The material demonstrates enhanced catalytic properties, high surface reactivity, and efficient adsorption, making it suitable for applications in environmental remediation, energy production, and biomedical treatments.

The nanocomposite may include g-$C_3N_4$ in an amount ranging from 5 to 15 wt. %, including 5 to 7 wt. %, 7 to 9 wt. %, 9 to 11 wt. %, 11 to 13 wt. %, and 13 to 15 wt. % based on the total weight of the nanocomposite. The nanocomposite may include 10±2, 1.5, 1, 0.75, 0.67, 0.5, 0.33, 0.25, 0.125, 0.1, 0.05, or 0.01 wt. % of graphite-phase carbon nitride (g-$C_3N_4$).

The nanocomposite may include $MnO_2$ in an amount ranging from 2 to 7 wt. %, including 3 to 7 wt. %, 7 to 11 wt. %, 11 to 13 wt. %, 13 to 15 wt. %, and 15 to 17 wt. % based on the total weight of the nanocomposite. The nanocomposite may include 5±1, 0.75, 0.67, 0.5, 0.33, 0.25, 0.125, 0.1, 0.05, or 0.01 wt. % of $MnO_2$.

The nanocomposite may include magnesium aluminum oxide ($MgAl_2O_4$) in an amount ranging from 75 to 95 wt. %, including 80 to 82 wt. %, 82 to 84 wt. %, 84 to 86 wt. %, 86 to 88 wt. %, and 88 to 90 wt. % based on the total weight of the nanocomposite. The nanocomposite may include 85±5, 4, 3.33, 2.5, 2, 1.5, 1, 0.75, 0.67, 0.5, 0.33, 0.25, 0.125, 0.1, 0.05, or 0.01 wt. % of magnesium aluminum oxide ($MgAl_2O_4$).

The nanocomposite may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, individually or in total/in any combination, of $TiO_2$, $Ti_2AlN$, $Fe_3O_4$, AlN, ZnO, and/or $SiO_2$, relative to a total metal oxide weight.

The nanocomposite may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, of carbon nanotubes, relative to total nanocomposite weight or total carbonaceous matter weight in the nanocomposite.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, of carbon dots, relative to total nanocomposite weight or total carbonaceous matter weight in the nanocomposite.

The nanocomposite may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % AgBr, relative to a total metal oxide weight.

The nanocomposite may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % tungsten oxide, relative to a total nanocomposite weight.

The nanocomposite may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % Co, relative to total nanocomposite weight.

The nanocomposite may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, individually or in total, of CuO and/or $WO_3$, relative to total nanocomposite weight.

The nanocomposite may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % elemental state metal, relative to total nanocomposite weight. The elemental metal may be Co and/or Fe, or may exclude these.

The nanocomposite may include no more than 10, 7.5, 5, 4, 3, 2, 1, 0.5, 0.1, 0.01, 0.001, 0.0001, or 0.00001 wt. %, preferably no more than 9 wt. %, preferably no more than 8 wt. %, preferably no more than 7 wt. %, preferably no more than 6 wt. %, preferably no more than 5 wt. %, preferably no more than 4 wt. %, preferably no more than 3 wt. %, preferably no more than 2 wt. %, preferably no more than 1 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % MgO, relative to a total metal oxide weight.

The nanocomposite may include no more than 10, 7.5, 5, 4, 3, 2, 1, 0.5, 0.1, 0.01, 0.001, 0.0001, or 0.00001 wt. %, preferably no more than 9 wt. %, preferably no more than 8 wt. %, preferably no more than 7 wt. %, preferably no more than 6 wt. %, preferably no more than 5 wt. %, preferably no more than 4 wt. %, preferably no more than 3 wt. %, preferably no more than 2 wt. %, preferably no more than 1 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % $VO_4$, relative to total vanadium-oxide weight. The nanocomposite may include no more than 1 wt. % V-doped ZnO, relative to total nanocomposite weight.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbonaceous material besides the graphitic carbon nitride. A low concentration of carbonaceous material contributes to maintaining the desired structural integrity and functional properties of the nanocomposite. The minimal amount of additional carbon material can prevent or reduce any significant interference with the performance of the graphitic carbon nitride, particularly in applications such as photocatalysis or energy storage, where the purity and specific properties of the g-$C_3N_4$ are crucial.

The nanocomposite may include no more than 1, 0.75, 0.5, 0.25, 0.1, 0.01, 0.001, 0.0001, or 0.00001 atom of Ce, preferably no more than 0.9 atoms of Ce, preferably no more than 0.8 atoms of Ce, preferably no more than 0.7 atoms of Ce, preferably no more than 0.6 atoms of Ce, preferably no more than 0.5 atoms of Ce, preferably no more than 0.4 atoms of Ce, preferably no more than 0.3 atoms of Ce, preferably no more than 0.2 atoms of Ce, preferably no more than 0.1 atoms of Ce, preferably no more than 0.05 atoms of Ce, and preferably no more than 0.01 atoms of Ce, relative to 100 atoms of Mn.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. %, individually or in any combination, of $K_2Ti_8O_{17}$, $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$(0≤x≤0.7), $Mn_{0.1}Mg_{0.2}$ (Co, Ni, Zn)$_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}CO_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and/or $LaFeO_3$, relative to a total metal oxide weight.

The nanocomposite may include no more than 10, 7.5, 5, 4, 3, 2, 1, 0.5, 0.1, 0.01, 0.001, 0.0001, or 0.00001 wt. %, preferably no more than 9 wt. %, preferably no more than 8 wt. %, preferably no more than 7 wt. %, preferably no more than 6 wt. %, preferably no more than 5 wt. %, preferably no more than 4 wt. %, preferably no more than 3 wt. %, preferably no more than 2 wt. %, preferably no more than 1 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % elemental metal relative to total metal content. The metal may exclude or include Zn, Ce, Gd, La, Ba, Ti, Ca, Sr, Zr, Pb, Ni, Ag, Pt, Co, Cu, Mn, Cd, Ta, Nb, Pr, and/or Bi, e.g., in any combination.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. %, individually or in any combination, relative to total carrier weight, of $SiO_2$, $TiO_2$, ZnO, and/or ZnS.

The nanocomposite may have none or no more than 0.1, 0.075, 0.05, 0.025, 0.01, 0.001, 0.0001, or 0.00001 parts, individually, of thiol, amine, carboxylate, and/or hydroxyl functionalizations per 100 $MnO_2$ units (or per 1 $MnO_2$ unit), relative to a total metal oxide weight.

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e., diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 nm, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g., $N_2$ adsorption), mercury intrusion porosimetry, and imaging techniques such as scanning electron microscopy (SEM), and X-ray computed tomography (XRCT).

The Brunauer-Emmett-Teller (BET) surface area of the nanocomposite is in a range of from 16.2 to 20.2 square meters per gram (m$^2$/g), preferably 16.5 to 20 m$^2$/g, and preferably 18 m$^2$/g. The surface area on the nanocomposite is 18.7±3.33, 2.5, 2, 1.5, 1, 0.75, 0.67, 0.5, 0.33, 0.25, 0.125, 0.1, 0.05, or 0.01 m$^2$/g. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

The average pore distribution of the nanocomposite may include, but is not limited to, crystalline average pore distribution, bimodal, trimodal, multimodal, narrow, broad, and Gaussian. The average pore distribution of nanocomposite may be unimodal, indicating a single dominant pore size within the material. This unimodal distribution suggests that the nanocomposites possess a relatively narrow pore size range, resulting in more uniform pore structures and enhancing specific properties such as adsorption capacity, catalytic activity, or surface reactivity.

In some embodiments, an average pore diameter of the nanocomposite, according to Barrett-Joyner-Halenda (BJH) measurement method, may be in a range of from 5 to 15 nm, preferably 6 to 14 nm, preferably 7 to 13 nm, preferably 8 to 12 nm, and preferably 9 to 11 nm. The nanocomposite may have an average pore diameter of 8.34±2.5, 2, 1.5, 1, 0.75, 0.5, 0.25, 0.1, 0.5, or 0.1 nm.

In some embodiments, an average pore volume of the nanocomposite, according to the BJH measurement method, may be in a range of from 0.025 to 0.075 $cm^3/g$, preferably 0.04 to 0.06 $cm^3/g$, preferably 0.05 to 0.065 $cm^3/g$, and preferably 0.055 to 0.07 $cm^3/g$. The average pore volume of the nanocomposite 0.05±0.01, 0.0075, 0.005, 0.0025, 0.001, 0.0001, or 0.00001 $cm^3/g$.

The mass relationship of the nanocomposite may be in a range of from 9 to 11:4 to 6:84 to 86, and preferably 9.5 to 10.5:4.5 to 5.5:84.5 to 85.5. The mass relationship of the nanocomposite may be 10:5:85, while tolerable variations of any of these values may be±5, 4, 3.33, 3, 2.5, 2, 1.5, 1, 0.75, 0.5, 0.25, 0.1, 0.5, or 0.1.

The nanocomposite may have a (220) spinel interplanar spacing in a range of from 0.258 to 0.338 nm, preferably 0.260 to 0.275 nm, preferably 0.275 to 0.300 nm, and preferably 0.275 to 0.330 nm, according to selected area electron diffraction (SAED). The nanocomposite may include a (400) spinel interplanar spacing in a range of from 0.165 to 0.245 nm, preferably 0.165 to 0.230 nm, preferably 0.170 to 0.210 nm, and preferably 0.180 to 0.240 nm, according to SAED. The nanocomposite may have a (002) $MnO_2$ interplanar spacing in a range of from 0.106 to 0.186 nm, preferably 0.130 to 0.185 nm, preferably 0.150 to 0.175 nm, and preferably 0.170 to 0.180 nm, according to SAED. The nanocomposite may have a (211) $Al_2O_3$ interplanar spacing in a range of from 0.093 to 0.173 nm, preferably 0.097 to 0.157 nm, preferably 0.107 to 0.147 nm, and preferably 0.117 to 0.167 nm; according to SAED.

The nanocomposite may have a (220) spinel interplanar spacing of 0.298±2% nm, (400) spinel interplanar spacing of 0.205±2% nm, (002) $MnO_2$ interplanar spacing of 0.146±2% nm, and (211) $Al_2O_3$ interplanar spacing of 0.133±2% nm, according to SAED. In some embodiments, an XRD spectrum of the nanocomposite under Cu-filtered CuKα radiation (1.5418 Å) powered at 45 kilovolt (kV) and 10 milliampere (mA) may have 2θ peaks of a $MnO_2$ pyrolusite phase at 28.4±1, 40.5±1, 44.9±1, 56.0±1, 66.4±1, and/or 79.1±1°, a $MgAl_2O_4$ spinel phase at 19.1±1, 31.3±1, 44.8±1, 56.1±1, 59.5±1, 74.09±1, and/or 78.1±1°, a MgO cubic phase at 42.8±1, 62.2±1, and/or 74.6±1°, a $Al_2O_3$ phase at 31.3±1, 34.3±1, and/or 61.6±1°, and/or g-$C_3N_4$-related diffractions at 18.8±1, 28.2±1, 35.5±1, 40.7±1, 44.6±1, and/or 73.7±1°. No more than 5, 4, 3.33, 2.5, 2, 1.5, 1, 0.75, 0.67, 0.5, 0.33, 0.25, 0.125, 0.1, 0.05, 0.01, 0.001, 0.0001, or 0.00001% relative intensity of any other phase may be detected in the XRD spectrum. The $MgAl_2O_4$ spinel may be represented by diffractions at 2θ values of 44.8, 56.1, 59.5, 74.09, 78.1, 19.1, and/or 31.3°. At 2θ values of 42.8, 62.2, and 74.6°, the cubic phase of MgO may be detected. At 2θ values of 28.4, 40.5, 44.9, 56.0, 66.4, and/or 79.1°, pyrolusite phase of $MnO_2$ may be detected. At 2θ values of 18.8, 28.2, 35.5, 40.7, 44.6, and/or 73.7° g-$C_3N_4$-related diffractions may be detected.

$MgAl_2O_4$ may have a spinel phase. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse."

The spinel phase with the chemical formula $MgAl_2O_4$ may be a mineral type of this oxide family. $MgAl_2O_4$ can be used in various applications, such as in metallurgical, electrochemical, radio-technical, and chemical industrial fields owing to its high thermal stability (melting point at 2135° C., high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 30 and 1400° C., low dielectric constant, low density (3.58 gram per cubic centimeter ($g/cm^3$)), high thermal shock resistance, hydrophobicity, and low surface acidity.

The nanocomposite may consist essentially of sheet morphologies, preferably nanosheets (i.e., such that no more than 5% of the average absorption rate of indigo carmine over the first 30 minutes is lost relative to a nanocomposite with pure sheet morphologies), although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. The nanocomposite may have a structure including a dispersion of homogeneous spherical metal oxides nanoparticles on a two-dimensional porous structure including curled and wrinkled nanosheets and platelets of the g-$C_3N_4$. In some embodiment, the graphitic $C_3N_4$ in the nanocomposite may include no more than inevitable traces of boron. In some embodiment, the nanocomposite may include no clay.

Referring to FIG. 1, a method 50 for removing contaminants from water is described. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 may include contacting contaminated water, comprising a heavy metal and/or an organic pollutant, with the nanocomposite, thereby adsorbing the heavy metal and/or the organic pollutant onto the nanocomposite, as an adsorbed material. This interaction facilitates the adsorption of heavy metals and/or organic pollutants onto the nanocomposite. The nanocomposite preferentially adsorbs charged indigo-derivative dyes to radioactive metals. The nanocomposite adsorbs organic dyes as the organic pollutant. The organic pollutant may be a dye, a phenol, a polycyclic aromatic hydrocarbon, an herbicide, a pesticide, a persistent organic contaminant, or the like. The dye may be indigo carmine dye. The method may not include sonicating any starting materials, particularly not in a range of from 1 to 100 kHz.

In some embodiment, the organic pollutant may be adsorbed and may include an indolinone sulfonate substructure (e.g., indigo carmine) in a mass ratio of 0.01 to 0.2 parts, preferably 0.05 parts, preferably 0.1 parts, preferably 0.15 parts, preferably 0.2 parts, of the organic molecules per part of the nanocomposite. The organic pollutant adsorbed may include an indolinone sulfonate substructure (e.g., indigo carmine) in a mass ratio of 0.0954 parts of the organic molecules per part of the nanocomposite. In some embodiment, at least 70 mg, preferably at least 75, at least 80 mg, at least 85 mg, at least 90 mg, at least 95 mg of the organic pollutant may be adsorbed per gram of nanocomposite within 30 minutes of the contacting the organic pollutant with the nanocomposite. The about 95.4 mg per gram of nanocomposite may be adsorbed from the water within 30 minutes of contacting the organic pollutant with the nanocomposite. The organic contaminant may be a heavy metal. Suitable examples of the heavy metals include, but are not limited to, Cd, Cr, Cu, Fe, Pb, Ni, Ag, Zn, and/or U, though any of these may be excluded. The nanocomposite, however, may be selective to organic materials, particularly dyes (e.g., indigo carmine type), relative to any or all of these metals.

At step 54, the method 50 may include removing the adsorbed material from the contaminated water, thereby reducing the concentration of the heavy metal in the contaminated water by at least 2 wt. %. The adsorbed materials are separated from the contaminated water, thereby reducing a concentration of the heavy metal in the contaminated water by at least 2 wt. %, preferably at least 2.5 wt. %, preferably at least 3 wt. %, preferably at least 3.5 wt. %, preferably at least 4 wt. %, preferably at least 5 wt. %.

The following examples are provided solely for illustration and are not to be construed as limitations of the present disclosure, as many variations thereof are possible without departing from the spirit and scope of the present disclosure.

EXAMPLES

The following examples demonstrate a method of removing contaminants from water. The examples are provided solely for illustration and are not to be construed as limitations of the present disclosure, as many variations thereof are possible without departing from the spirit and scope of the present disclosure.

Example 1: Fabrication of g-$C_3N_4$@$MnO_2$/$MgAl_2O_4$ (10:5:85, Wt. %) Nanocomposite According to the present disclosure, magnesium nitrate, and aluminum nitrate were added together in one beaker with manganese chloride, in a predetermined amount (here, stoichiometric), to produce a 10% $MnO_2$@$MgAl_2O_4$ nanocomposite. Further, about 10 grams (g) of methanol, as a fuel, was added to the beaker, followed by 30 milliliters (mL) of distilled water. The beaker was heated till a clear solution was obtained, and heated further till dryness. The obtained product was ground in a mortar, transferred to a 150 mL porcelain dish, and calcined at 700° C. for 3.0 hours. Furthermore, the 10% $MnO_2$@$MgAl_2O_4$ product was cooled down to room temperature and weighed, ground with urea in an amount suitable (here, 2 g urea to 20 g of the 10% $MnO_2$/$MgAl_2O_4$ product, but depending upon the reaction conditions, this may be 5, 10, 15, 20, 25, 33, 50, 100, 150, 250, 500, or 1000 parts by weight of urea to 100 parts by weight of 10% $MnO_2$/$MgAl_2O_4$, and optionally no more than 100,000, 50,000, 25,000, 10,000, 5,000, 1,000, 750, 500, 400, 333, 250, 125, 100, 75, 50, 25, 20, 15, or 10 parts by weight urea to 100 parts) to produce g-$C_3N_4$@$MnO_2$/$MgAl_2O_4$ (10:5:85, wt. %) nanocomposite. The quadruple mixture was returned and heated to 600° C. for 60 minutes in a covered porcelain crucible, and subsequently, the g-$C_3N_4$@$MnO_2$/$MgAl_2O_4$ (10:5:85, wt. %) nanocomposite was collected.

Example 2: Characterization

X-ray diffraction (XRD) was used to identify the crystalline states in each specimen, employing the JDX-8030 X-ray, JEOL, made in Japan. Cu-filtered Cu-Kα radiation (1.5418 Å) powered at 45 kV and 10 mA was used to run the patterns. The specimens were tested at ambient temperatures in a range of 2θ=5° to 80°. The surface morphologies of the obtained samples were analyzed using images of transmission electron microscopy (TEM), selected area electron diffraction (SAED), and high-resolution transmission electron microscopy (HRTEM), obtained by a Tecnai-G20 (USA) transmission electron microscope with a 200 kV speed voltage.

Results and Discussion

Figure 2:
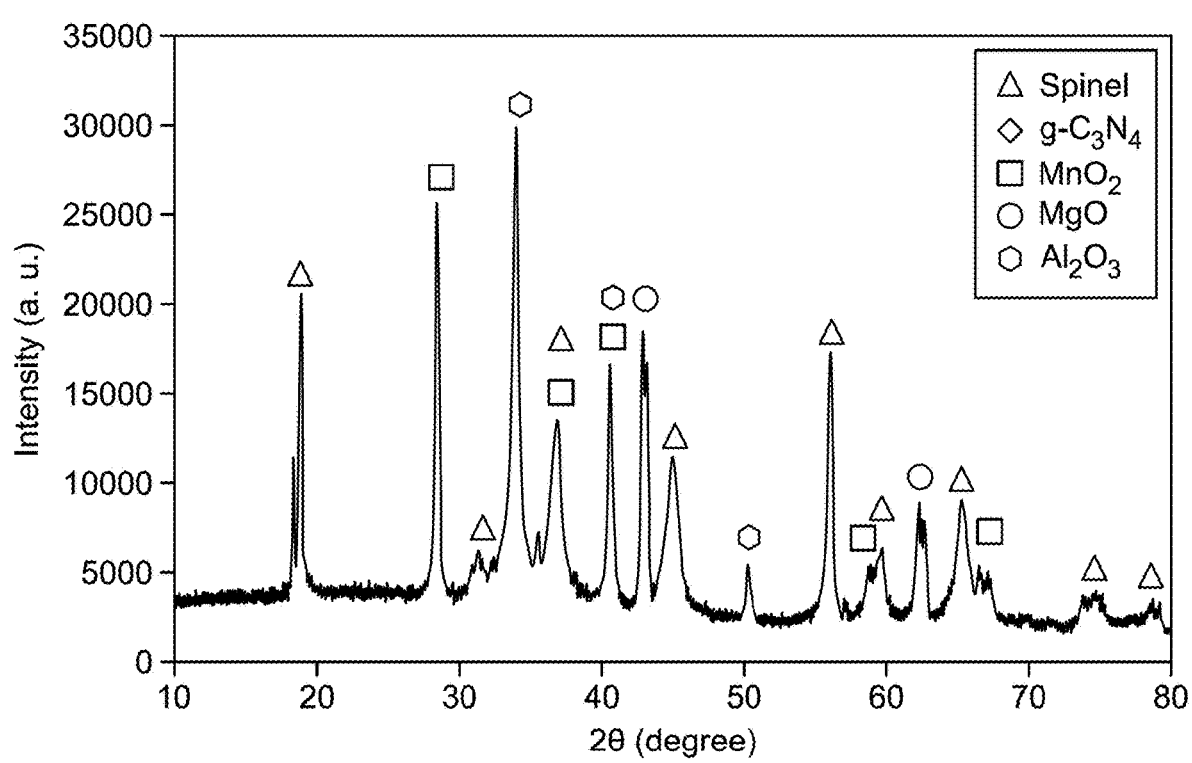
FIG. 2 is a graph depicting X-ray diffraction (XRD) patterns of an inventive 10% g-$C_3N_4$@$MnO_2$/$MgAl_2O_4$ nanocomposite.

As mentioned above, XRD was used to examine the crystallinity and phase identification of the g-$C_3N_4$@$MnO_2$/$MgAl_2O_4$ catalyst, the results are depicted in FIG. 2. The high crystalline nature of the nanocomposite was indicated by sharp peaks and high-intensity values, as shown in FIG. 2. The diffraction patterns are compared to the standard COD cards to demonstrate the presence of $MnO_2$, MgO, $MgAl_2O_4$, $Al_2O_3$, and g-$C_3N_4$ phases. The $MgAl_2O_4$ spinel's diffractions were recorded at 2θ values of 44.8, 56.1, 59.5, 74.09, 78.1, 19.1, and 31.3°. The standard COD card number 9001364 states that these diffractions originated from the (111), (220), (400), (422), (511) (620), and (622) planes, respectively. MgO(COD card, No. 9000499) showed a cubic phase at 2θ values of 42.8, 62.2, and 74.60. The (200), (220), and (311), respectively, are represented by these lines. It was previously reported that MgO was present together with the $MgAl_2O_4$ spinel phase. The pyrolusite phase of $MnO_2$ (COD No. 2105790) may be closely matched with the diffraction lines seen at 28.4, 40.5, 44.9, 56.0, 66.4, and 79.1°. According to COD No. 1534042, the g-$C_3N_4$ diffractions were detected at 18.8, 28.2, 35.5, 40.7, 44.6, and 73.70. At 31.3, 34.3, and 61.6°, $Al_2O_3$ traces were detected (COD No. 4002418). There were no further phases found, suggesting that g-$C_3N_4$@$MnO_2$/$MgAl_2O_4$ was successfully fabricated.

Figure 3A:
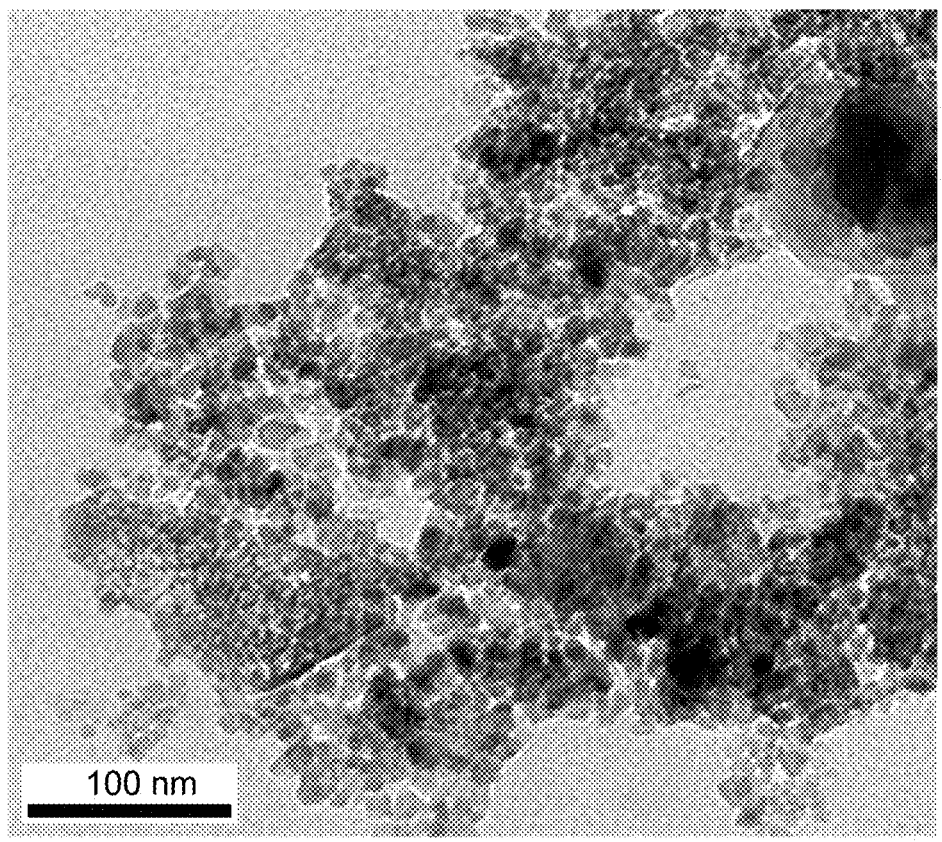
FIG. 3A is a transmission electron microscopy (TEM) image of an inventive 10% g-$C_3N_4$@$MnO_2$/$MgAl_2O_4$ nanocomposite.
Figure 3B:
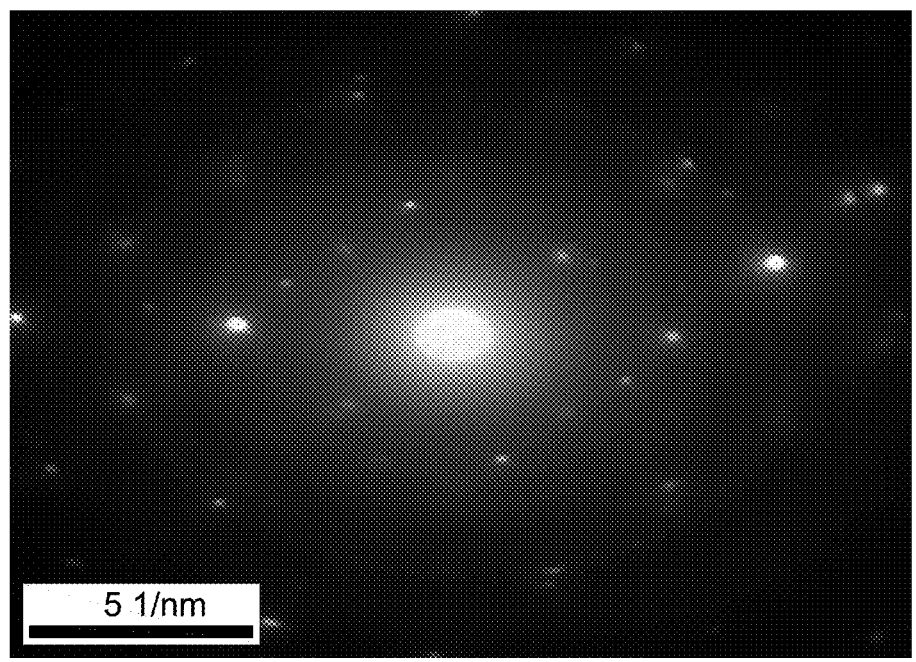
FIG. 3B is a selected area electron diffraction (SAED) pattern of an inventive 10 g-$C_3N_4$@$MnO_2$/$MgAl_2O_4$ nanocomposite.
Figure 3C:
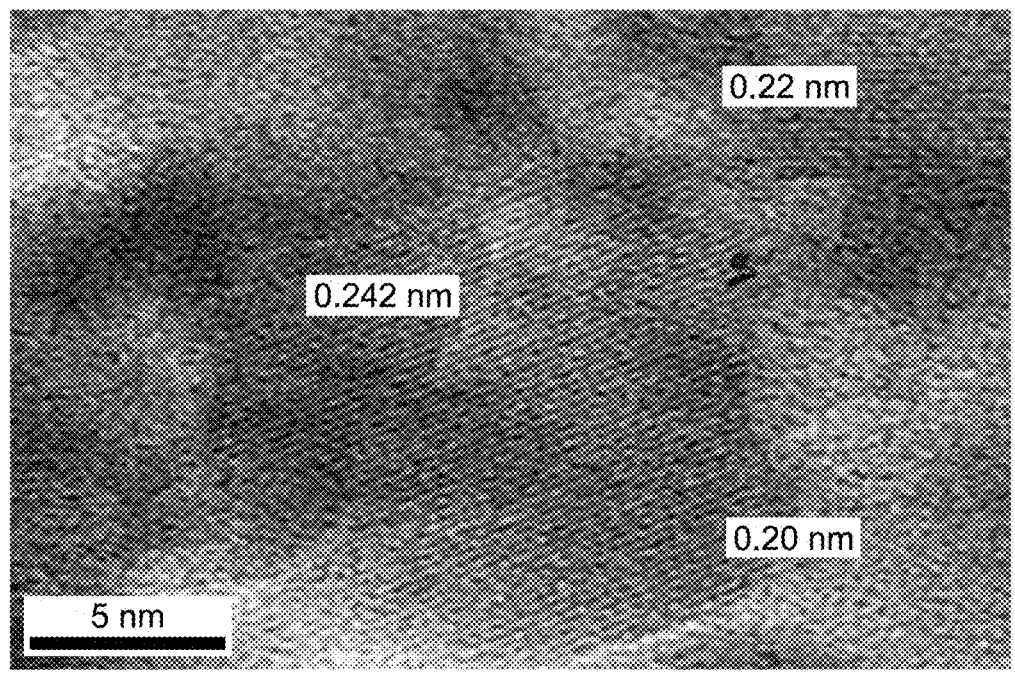
FIG. 3C is a high-resolution transmission electron microscopy (HRTEM) image of an inventive 10% g-$C_3N_4$@$MnO_2$/$MgAl_2O_4$ nanocomposite.
Figure 3D:
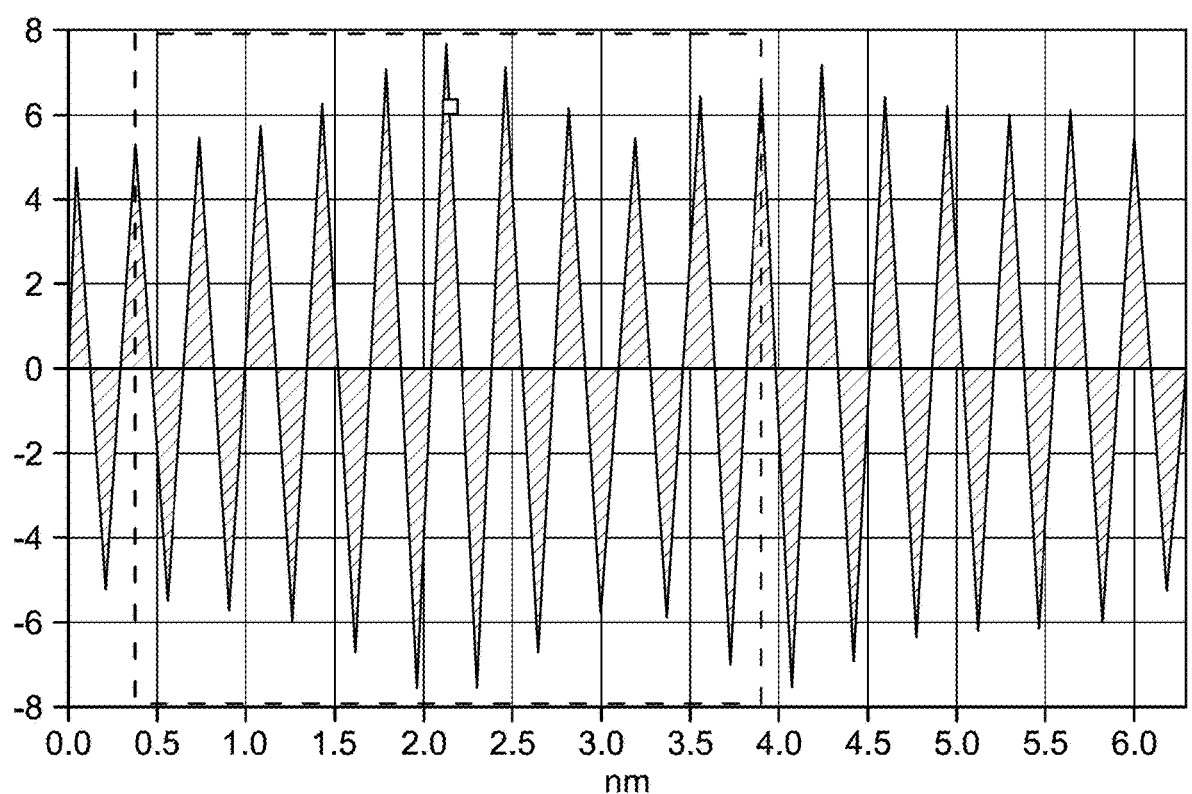
FIG. 3D is a fast Fourier transform (FFT) spectra of an inventive 10% g-$C_3N_4$@$MnO_2$/$MgAl_2O_4$ nanocomposite.
Figure 3E:
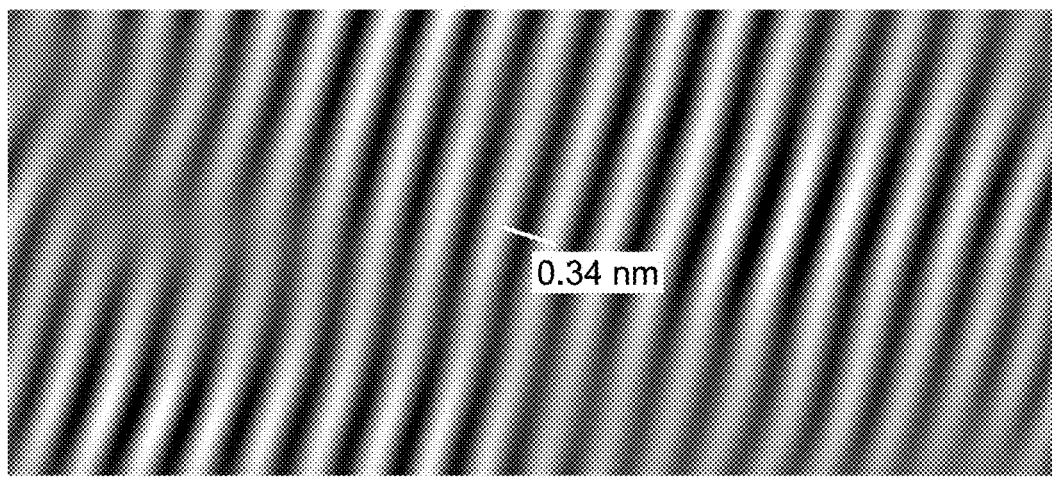
FIG. 3E is an inverse fast Fourier transform (IFFT) spectra of an inventive 10% g-$C_3N_4$@$MnO_2$/$MgAl_2O_4$ nanocomposite.

Further, TEM images of g-$C_3N_4$@$MnO_2$/$MgAl_2O_4$ nanocomposite are shown in FIG. 3A. The TEM images show the well dispersion of homogeneous spherical metal oxides nanoparticles with a size of about 7.9 nm on two-dimensional porous structure constructed with curled and wrinkled nanosheets and platelets of the g-$C_3N_4$. The corresponding SAED pattern, shown in FIG. 3B, reveals diffraction spots with interplanar spacing of 0.298 nm, 0.205 nm, 0.146, 0.133 nm due to (220, spinel), (400, spinel), (002, $MnO_2$) and (211, $Al_2O_3$) diffraction planes, respectively. The corresponding HRTEM of the nanocomposite, depicted in FIG. 3C, shows a plane spacing of 0.242 nm and 0.20 nm related to (311), and (400) planes of spinel, and 0.22 nm related to (200) plane of $MnO_2$, characterizing the heterostructure formation. The fast Fourier transform (FFT) and inverse fast Fourier transform (IFFT) measurements, as depicted in FIG. 3D and FIG. 3E, show a 'd' value of about 0.34 nm given to g-$C_3N_4$@$MnO_2$/$MgAl_2O_4$ nanocomposite, signifying the lattice spacing of (002), indicating the development of spinel structure.

Figure 4A:
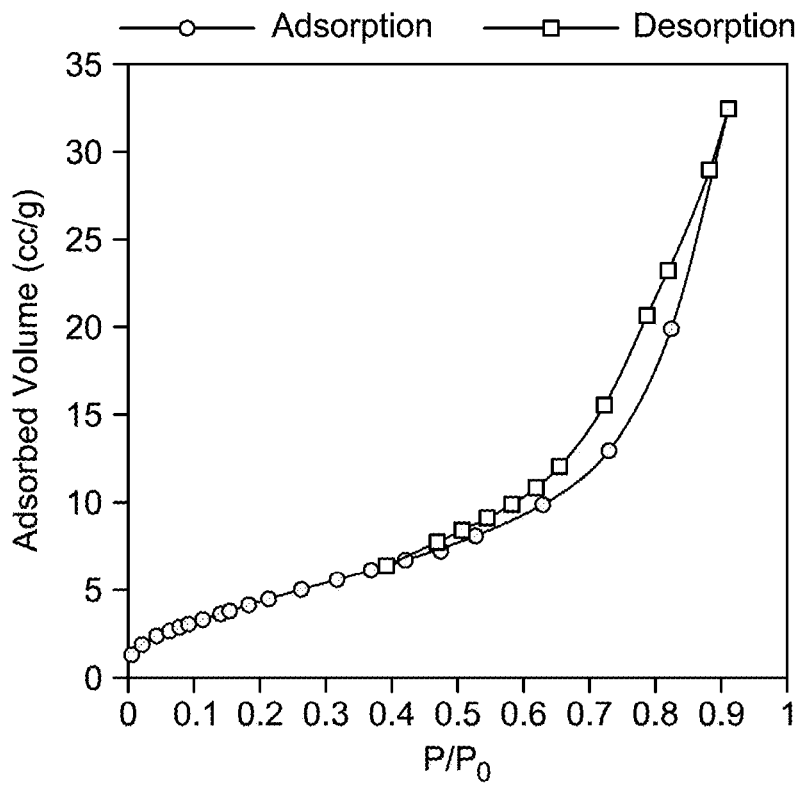
FIG. 4A is a graph depicting nitrogen adsorption-desorption isotherm of an inventive g-$C_3N_4$@$MnO_2$/$MgAl_2O_4$ nanocomposite.
Figure 4B:
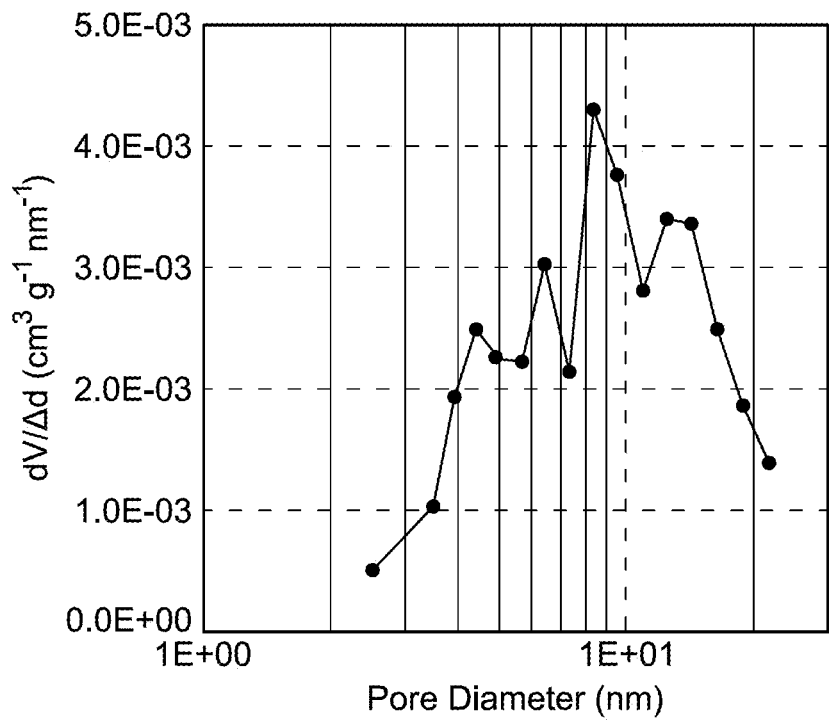
FIG. 4B is a graph depicting the pore size distribution of an inventive g-$C_3N_4$@$MnO_2$/$MgAl_2O_4$ nanocomposite.

FIG. 4 displays the nitrogen adsorption-desorption isotherms of $MnO_2$/$MgAl_2O_4$/g-$C_3N_4$ nanocomposite. The nitrogen sorption isotherm of the composite relates to type IV with clear hysteresis loop, indicating the formation of mesoporous structures. However, shifting the loop to a relatively lower pressure (P/P°=0.39-1) suggests a decrease in the size of the mesopores, which may result from the deposition of metal oxides particles in the wide pores of g-$C_3N_4$. Furthermore, the BET surface area of the $SnBi_3$ sample was calculated to be 18.7 m$^2$/g. The marked high specific surface area reflects the good dispersion of these metal oxides nanoparticles on g-$C_3N_4$. Moreover, the pore size distribution curves, plotted using the BJH method, for the $MnO_2$/$MgAl_2O_4$/g-$C_3N_4$ sample exhibited unimodal distribution with average pore diameters maximized at 8.34 nm and pore volume of 0.05 cm$^3$/g. All the isotherms belong to the category H3 type of pores, which do not exhibit limiting adsorption at high P/P°, and arise due to aggregation of plate-like particles giving rise to slit-shaped pores. The above observed trend indicates that the assembly of $MnO_2$/$MgAl_2O_4$/g-$C_3N_4$ composite provoked a mesoporous array.

Figure 5:
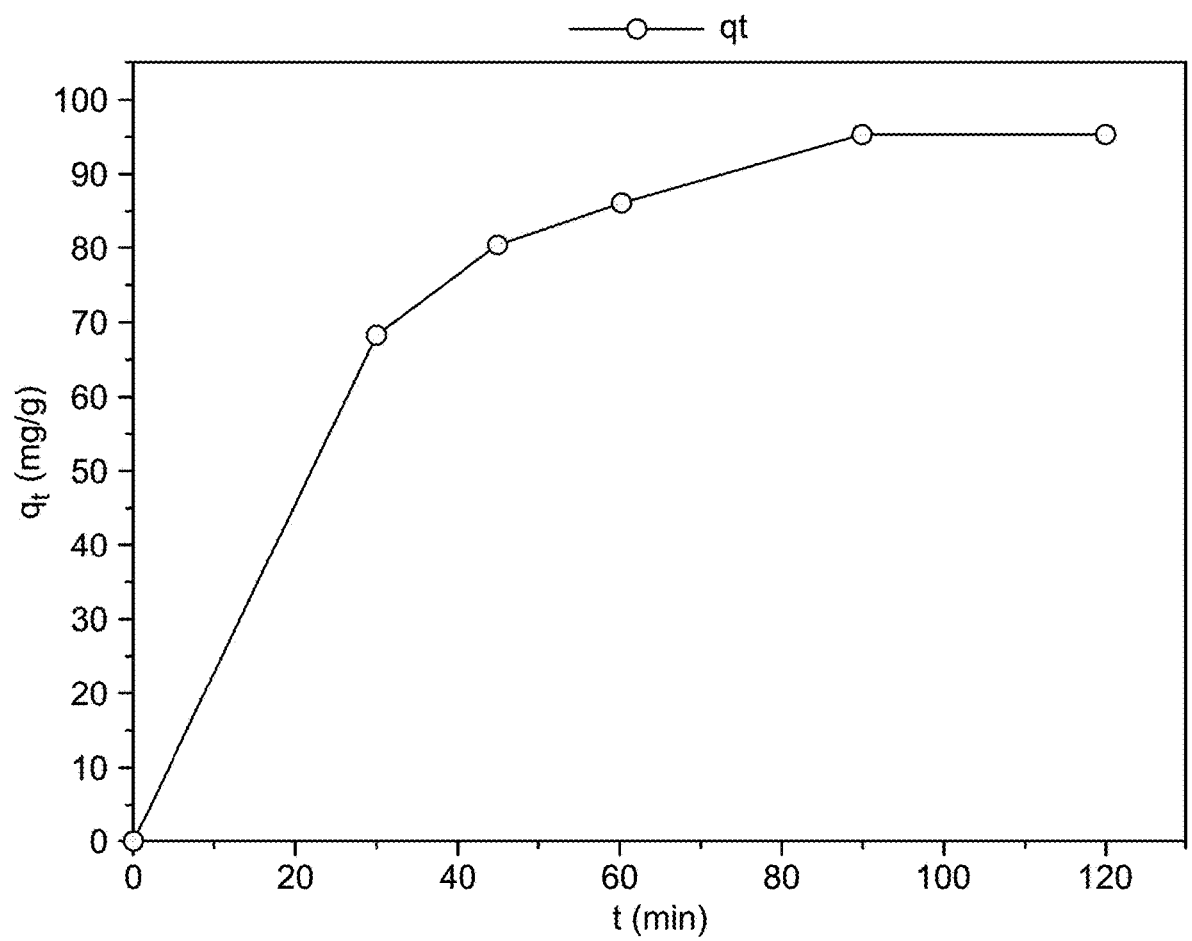
FIG. 5 is a graph depicting adsorption of indigo carmine dye from water by an inventive prepared g-$C_3N_4$@$MnO_2$/$MgAl_2O_4$ nanocomposite.

An accurate mass of 50 mg of the g-$C_3N_4$@$MnO_2$/$MgAl_2O_4$ was transferred to a 120 mL beaker to which 100 mL of 50 mg/L indigo carmine dye was added, and an aliquot was picked at serial time intervals till about 2.0 hours. The portion of the solution was filtered through a 0.22 μm syringe filter, and the absorbance of the dye in the solution was measured via an ultraviolet visible (UV-vis) spectrophotometer, as shown in FIG. 5. The measured absorbance was employed to compute the sorption capacity of the nanohybrid, which reached 95.4 mg indigo carmine per 1.0 gram of the g-$C_3N_4$@$MnO_2$/$MgAl_2O_4$.

Numerous modifications and variations of the present disclosure are possible in light of the above teachings. It is therefore to be understood that within the scope of the appended claims, the invention may be practiced otherwise than as specifically described herein.

The invention claimed is:

1. A method of removing a contaminant from water, the method comprising:
   contacting contaminated water, comprising a heavy metal and/or an organic pollutant, with a nanocomposite comprising graphitic $C_3N_4$, $MnO_2$, and $MgAl_2O_4$ in a mass relationship to each other in a range of from 5 to 15:2 to 7:75 to 95, thereby adsorbing the heavy metal and/or the organic pollutant onto the nanocomposite, as an adsorbed material; and
   removing the adsorbed material from the contaminated water, thereby reducing a concentration of the heavy metal in the contaminated water by at least 2 wt. %,
   wherein the heavy metal comprises Cd, Cr, Cu, Fe, Pb, Ni, Ag, Zn, and/or U, and
   wherein the organic pollutant comprises a dye.

2. The method of claim 1, wherein the average pore distribution of the nanocomposite is unimodal, and
   wherein a BET specific surface area of the nanocomposite is in a range of from 16.2 to 20.2 m$^2$/g, and/or
   wherein an average pore diameter of the nanocomposite, according to BJH measurement method, is in a range of from 5 to 15 nm, and/or
   wherein an average pore volume of the nanocomposite, according to the BJH measurement method, is in a range of from 0.025 to 0.075 cm$^3$/g.

3. The method of claim 1, wherein the nanocomposite has a (220) spinel interplanar spacing in a range of from 0.258 to 0.338 nm, (400) spinel interplanar spacing in a range of from 0.165 to 0.245 nm, (002) $MnO_2$ interplanar spacing in a range of from 0.106 to 0.186 nm, and (211) $Al_2O_3$ interplanar spacing in a range of from 0.093 to 0.173 nm, according to selected area diffraction.

4. The method of claim 1, wherein the mass relationship of the nanocomposite is in a range of from 9 to 11:4 to 6:84 to 86,
   wherein the nanocomposite has a (220) spinel interplanar spacing of 0.298±2% nm, (400) spinel interplanar spacing of 0.205±2% nm, (002) $MnO_2$ interplanar spacing of 0.146±2% nm, and (211) $Al_2O_3$ interplanar spacing of 0.133±2% nm, according to selected area diffraction,
   wherein an XRD spectrum of the nanocomposite under Cu-filtered CuKα radiation (1.5418 Å) powered at 45 kV and 10 mA has 20 peaks of an $MnO_2$ pyrolusite phase at 28.4±1, 40.5±1, 44.9±1, 56.0±1, 66.4±1, and 79.1±1°, an $MgAl_2O_4$ spinel phase at 19.1±1, 31.3±1, 44.8±1, 56.1±1, 59.5±1, 74.09±1, 78.1±1°,
   an MgO cubic phase at 42.8±1, 62.2±1, and 74.6±1°,
   an $Al_2O_3$ phase at 31.3±1, 34.3±1, and 61.6±1°,
   g-$C_3N_4$-related diffractions at 18.8±1, 28.2±1, 35.5±1, 40.7±1, 44.6±1, and 73.7±1°, and
   wherein no more than 5% relative intensity of any other phase is detected in the XRD spectrum.

5. The method of claim 1, wherein the organic pollutant is adsorbed and comprises an indolinone sulfonate substructure in a mass ratio of 0.01 to 0.2 parts of the organic molecules per part of the nanocomposite.

6. The method of claim 1, wherein the nanocomposite has no more than 0.1 parts, individually, of thiol, amine, carboxylate, and hydroxyl functionalization per 100 $MnO_2$ units, relative to a total metal oxide weight.

7. The method of claim 1, wherein the nanocomposite comprises no more than 1 wt. %, individually, of $TiO_2$, $Ti_2AlN$, $Fe_3O_4$, AlN, ZnO, and $SiO_2$, relative to a total metal oxide weight.

8. The method of claim 1, wherein the nanocomposite comprises no more than 1 atoms of Ce, relative to 100 atoms of Mn.

9. The method of claim 1, wherein carbon materials in the nanocomposite comprise no more than 1 wt. %, individually, carbon nanotubes and carbon dots, relative to total nanocomposite weight.

10. The method of claim 1, wherein the nanocomposite no more than 1 wt. % AgBr, relative to a total metal oxide weight, and
    wherein the nanocomposite no more than 1 wt. % tungsten oxide, relative to a total nanocomposite weight.

11. The method of claim 1, wherein the nanocomposite comprises no more than 1 wt. % Co, relative to total nanocomposite weight.

12. The method of claim 1, wherein the nanocomposite comprises no more than 1 wt. %, individually, CuO and $WO_3$, relative to total nanocomposite weight.

13. The method of claim 1, wherein the nanocomposite comprises no more than 1 wt. %, individually, elemental state Co and Fe, relative to total nanocomposite weight.

14. The method of claim 1, which does not comprise sonicating any starting materials in a range of from 1 to 100 kHz.

15. The method of claim 1, wherein the nanocomposite comprises no more than 10 wt. % MgO, relative to a total metal oxide weight, and
   wherein the nanocomposite comprises no clay.

16. The method of claim 1, wherein the nanocomposite obtained comprises no more than 1 wt. % carbonaceous material besides the graphitic carbon nitride, and
   wherein carbon materials in the nanocomposite comprise no nanotubes, relative to total nanocomposite weight.

17. The method of claim 1, wherein the nanocomposite comprises no more than 10 wt. % $VO_4$, relative to total vanadium-oxide weight, and
   wherein the nanocomposite comprises no more than 1 wt. % V-doped ZnO, relative to total nanocomposite weight.

18. The method of claim 1, wherein, relative to a total metal oxide weight, the nanocomposite comprises no more than 1 wt. %, individually, of $K_2Ti_8O_{17}$, $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}CO_{0.25}Fe_{2-x}O_4$, $Zn_{0.5}CO_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5\ \delta}$, $LaTiO_{3.5-\delta}$, $NaNbO_3$, and $LaFeO_3$.

19. The method of claim 1, wherein the graphitic $C_3N_4$ in the nanocomposite consists essentially of sheet morphologies, and
   wherein the graphitic $C_3N_4$ in the nanocomposite comprises no more than inevitable traces of boron.

20. The method of claim 1, wherein the nanocomposite comprises no more than 10 wt. %, individually, relative to total metal content, of any of Zn, Ce, Gd, La, Ba, Ti, Ca, Sr, Zr, Pb, Ni, Ag, Co, Cu, Mn, Cd, W, Ta, Nb, Pr, and Bi, and
   wherein the nanocomposite comprises no more than 1 wt. %, individually, relative to total carrier weight, of $SiO_2$, $TiO_2$, ZnO, and ZnS.

* * * * *